(12) United States Patent
Moreno et al.

(10) Patent No.: US 11,570,109 B2
(45) Date of Patent: Jan. 31, 2023

(54) SOFTWARE-DEFINED SERVICE INSERTION FOR NETWORK FABRICS

(71) Applicant: Cisco Technology, Inc., San Jose, CA (US)

(72) Inventors: Victor Manuel Moreno, Carlsbad, CA (US); Sanjay Kumar Hooda, Pleasanton, CA (US); Anoop Vetteth, Fremont, CA (US); Prakash C. Jain, Fremont, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 17/242,601

(22) Filed: Apr. 28, 2021

(65) Prior Publication Data
US 2022/0353186 A1 Nov. 3, 2022

(51) Int. Cl.
*H04L 1/00* (2006.01)
*H04L 47/125* (2022.01)
*H04L 12/16* (2006.01)
*H04L 45/00* (2022.01)

(52) U.S. Cl.
CPC ........... *H04L 47/125* (2013.01); *H04L 12/16* (2013.01); *H04L 45/56* (2013.01)

(58) Field of Classification Search
CPC ........ H04L 47/125; H04L 12/16; H04L 45/56
See application file for complete search history.

(56) References Cited

U.S. PATENT DOCUMENTS

| 7,194,753 | B1* | 3/2007 | Fries | H04N 21/4384 725/38 |
| 2008/0177896 | A1* | 7/2008 | Quinn | H04L 67/567 709/238 |
| 2009/0129352 | A1* | 5/2009 | Verma | H04L 63/101 370/338 |
| 2015/0124809 | A1* | 5/2015 | Edsall | H04L 45/74 370/390 |
| 2017/0310611 | A1* | 10/2017 | Kumar | H04L 69/00 |
| 2018/0139096 | A1* | 5/2018 | Lee | H04L 41/0893 |
| 2018/0165361 | A1 | 6/2018 | Erickson et al. | |
| 2020/0092201 | A1* | 3/2020 | Tillotson | H04L 12/4641 |
| 2020/0280587 | A1 | 9/2020 | Janakiraman et al. | |

* cited by examiner

Primary Examiner — Abdelnabi O Musa
(74) Attorney, Agent, or Firm — Lee & Hayes, P.C.

(57) ABSTRACT

This disclosure describes techniques for software-defined service insertion. The techniques include a method of configuring a network for service insertion. The techniques include processing a master policy correlating an endpoint group pair, of source endpoint group and destination endpoint group, to a service graph. The service graph indicates a template service chain, and the template service chain indicates an ordering of a plurality of services. Processing the master policy includes disaggregating the master policy into at least one location specific policy, each of the at least one location specific policy corresponding to a separate location in the network and including traffic steering directives corresponding to a portion of the plurality of services associated with the separate location. The techniques further include causing each of the at least one location specific policy to be stored in association with the separate location to which that location specific policy corresponds.

20 Claims, 8 Drawing Sheets

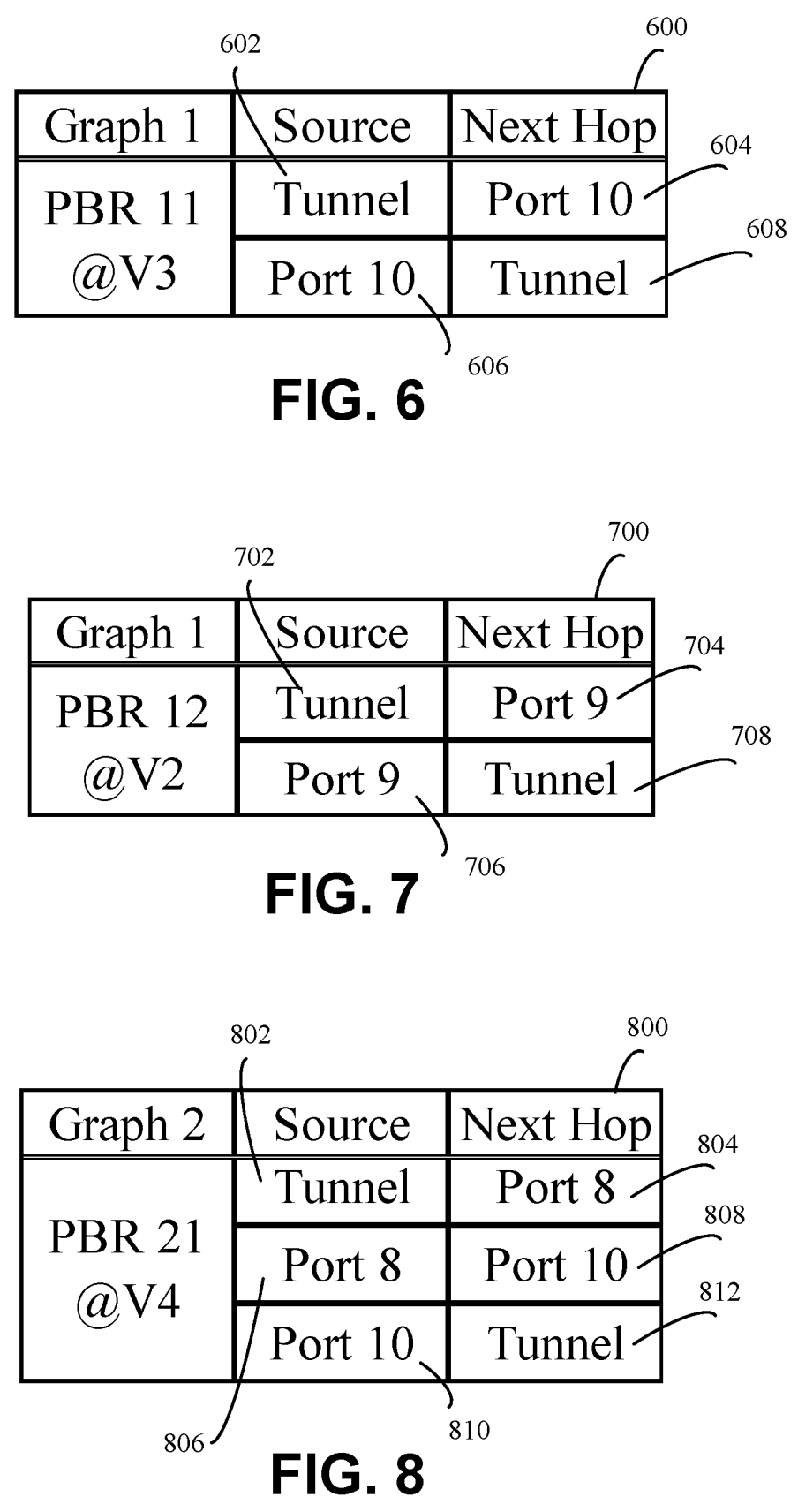

| Graph 1 | Source | Next Hop |
|---|---|---|
| PBR 11 @V3 | Tunnel | Port 10 |
| | Port 10 | Tunnel |

FIG. 6

| Graph 1 | Source | Next Hop |
|---|---|---|
| PBR 12 @V2 | Tunnel | Port 9 |
| | Port 9 | Tunnel |

FIG. 7

| Graph 2 | Source | Next Hop |
|---|---|---|
| PBR 21 @V4 | Tunnel | Port 8 |
| | Port 8 | Port 10 |
| | Port 10 | Tunnel |

FIG. 8

SOFTWARE-DEFINED SERVICE INSERTION FOR NETWORK FABRICS

TECHNICAL FIELD

The present disclosure relates generally to service insertion for network fabrics and, more specifically, to techniques to configure a network to apply services to network traffic while optimizing network resource utilization.

BACKGROUND

Service insertion, one example of which is known as service function chaining (SFC), is a technique that uses software-defined networking (SDN) capabilities to create a chain of connected network services, such as L4-L7 services like firewalls, network address translation (NAT), and intrusion protection. For example, draft-ietf-sfc-control-plane-08, "Service Function Chaining (SFC) Control Plane Components & Requirements," dated Oct. 23, 2016 describes techniques for service chaining.

Network operators can use service chaining to set up various options of network pathways through which certain network traffic is to travel. For example, a network pathway may designate a particular combination of connected services, depending on requirements of the network traffic itself or of the network. For example, requirements may include improving security, improving latency or improving quality of service.

Service chaining is being included in many SDN and network functions virtualization (NFV) use cases and deployments, including data centers (chaining together virtual or physical network functions), carrier networks (services for S/Gi-LANs), and virtual customer edge (including virtual customer premises equipment) deployments.

Service chaining may allow for automated provisioning for network applications for which network traffic processed by and/or generated by an application has characteristics different from network traffic processed by and/or generated by a different application. For example, streaming applications, such as video or voice-over-IP applications, may be more demanding of network resources than basic web browsing applications. Network service chaining can be configured such that network traffic processed by and/or generated by each of these network applications is handled differently in the network, which may help to ensure that network applications are provided the proper network resources and are behaving as expected, such as having encryption applied and operating at an expected quality of service.

It may be desirable to optimize network resource utilization in the course of implementing service insertion, as well as simplifying the infrastructure for and process of service insertion management.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 6, FIG. 7 and FIG. 8 show examples of location specific policy-based routing matrices, with lower level traffic steering indications resolved.

DESCRIPTION OF EXAMPLE EMBODIMENTS

Overview

Figure 1:
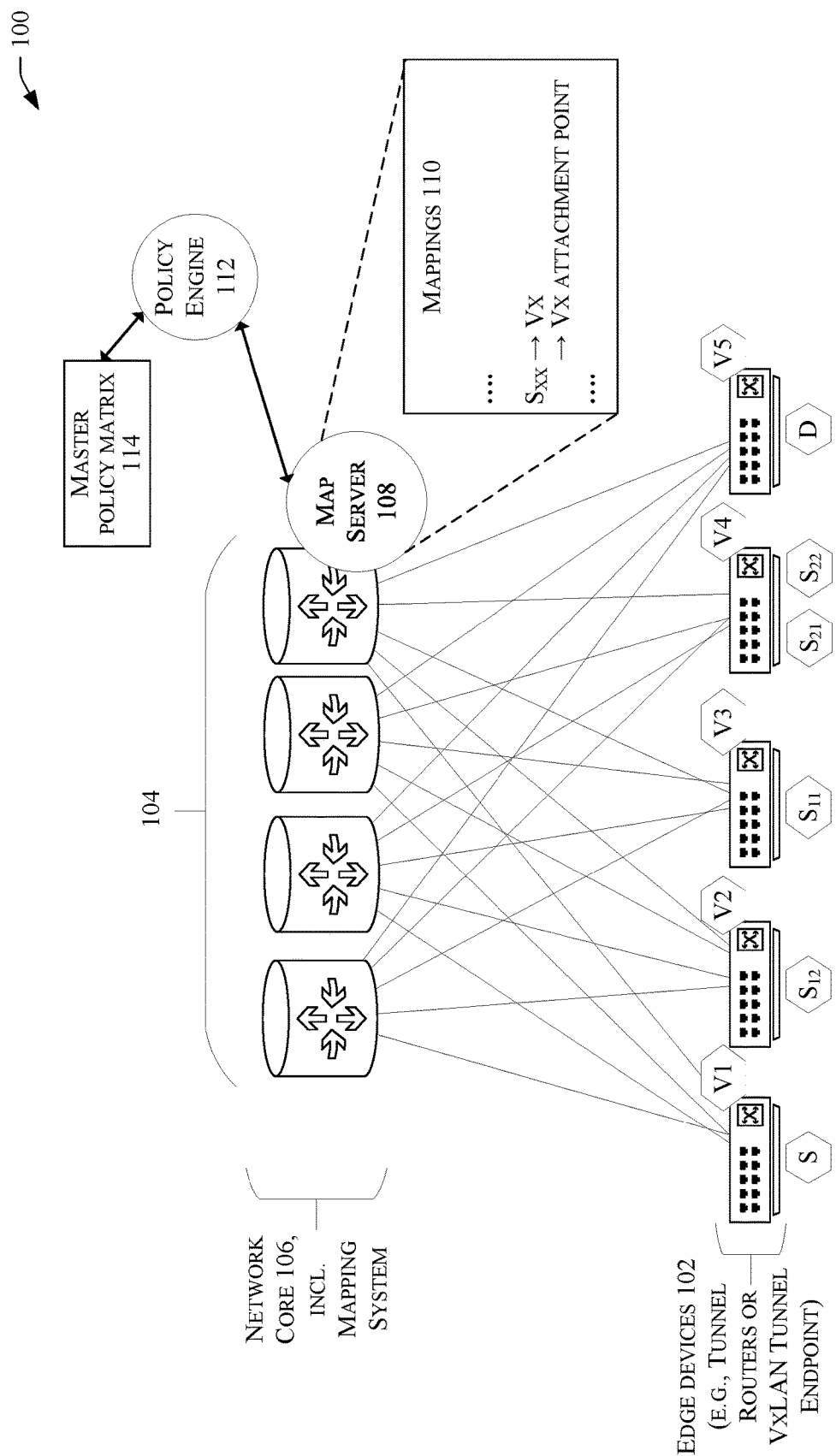
FIG. 1 is a diagram illustrating an example network fabric in which edge devices are connected to servers of a network core and also including a database of service mappings.

This disclosure describes techniques for software-defined service insertion. The techniques include a method of configuring a network for service insertion. The techniques include processing a master policy correlating an endpoint group pair, of source endpoint group and destination endpoint group, to a service graph. The service graph indicates a template service chain, and the template service chain indicates an ordering of a plurality of services. Processing the master policy includes disaggregating the master policy into at least one location specific policy, each of the at least one location specific policy corresponding to a separate location in the network and including traffic steering directives corresponding to a portion of the plurality of services associated with the separate location. The techniques further include causing each of the at least one location specific policy to be stored in association with the separate location to which that location specific policy corresponds.

The techniques also include a technique by which an edge device in a network fabric may accomplish service insertion. The techniques include the edge device receiving a location-specific service graph template. The location-specific service graph template indicates a service to be applied to particular network traffic by the edge device. The techniques further include the edge device generating a name-resolved location-specific service graph for the edge device. Generating the name-resolved location-specific service graph for the edge device includes resolving for the service, with reference to an inventory maintained by a control plane of the network fabric, a distinguished name for the service to an edge device interface indication for the service. The techniques may also include the edge device processing the name-resolved location-specific service graph for the edge device for particular network traffic, based at least in part on a source of the particular network traffic and a destination of the particular network traffic. There techniques may also include, based at least in part on the edge device processing the name-resolved locations-specific service graph for the edge device, steering the particular network traffic to the service indicated in the location-specific service graph template.

Additionally, the techniques described herein may be performed by a system and/or device having non-transitory computer-readable media storing computer-executable instructions that, when executed by one or more processors, performs the methods described herein.

EXAMPLE EMBODIMENTS

The process for a network administrator to configure a network for service insertion may include complicated and/or tedious manual configuration steps. For example, the network administrator may manually insert network addresses, for locations of services to be inserted, into a service graph to designate functions to be applied to network traffic between two EPGs. For example, the administrator may manually insert, into a service graph, the Internet Protocol (IP) address of each network node to which a service in the service graph is attached. The administrator may further manually insert, into the service graph, an identification of an interface of the edge device to which the service is attached. Further, for example, the network administrator may then manually change the network addresses or interface identification in the service graph if any services are moved or are assigned different network addresses, such as moving to a different network device or attaching to a different port of a network device.

Furthermore, some methods of implementing service insertion may include network infrastructure prepending a header to network traffic between a particular source EPG and a particular destination EPG, where the header indicates a path through the network nodes so that the inserted services may be applied to the network traffic. It may be complicated and/or expensive to have infrastructure throughout a network that is able to interpret and act on such a header, to cause the network traffic to be redirected to the various inserted services. For example, the size of such a header may not be fixed but, rather, may depend on how many services are to be inserted according to a particular service graph. Hardware to process such headers may be complex.

In accordance with techniques described herein, setting up service insertion may involve, generally, registering a service and deploying a service instance; and then configuring traffic redirection so that network traffic is subjected to the service according to a service insertion policy for the network traffic. Registering the service and deploying the service instance typically includes the service instance, when it first starts to execute, registering with a map server.

In many examples, multiple services are to be inserted for network traffic having a particular characteristic. The network may be configured such that the network traffic having the particular characteristic is routed between a source and destination such that the services are applied to the network traffic by the service instances as the network traffic travels from the source to the destination.

Using a service insertion process, a network administrator may set policies for applying the various services to network traffic having various characteristics. For example, the network administrator may configure a library of service graphs, where a service graph is a variation of the concept of a contract between endpoint groups (EPGs) of network traffic. For example, a service graph may be thought of as a template contract, where the specific EPGs for the service graph are yet to be designated. The service graph may define how two generic endpoint groups (EPGs) of network nodes may be connected, including designating services to be applied to network traffic between the two EPGs. The network administrator defines each service graph as a template of services, i.e., applied to a generic source EPG and destination EPG. The network administrator can associate a group policy, for particular EPG pairs, with a service graph. The network administrator may designate each service in a service graph by the name of the service, such as by a distinguished name. A distinguished name for a service may be thought of as a unique name that unambiguously indexes into a directory of information related to the service, such as information (which may itself be a distinguished name) about the edge device to which the service is attached. Such a method of identification may provide an indirection of service identification that may, for example, be leveraged to add elasticity to the definition of an edge device in a service graph. Associating the group policy with the service graph results in the network infrastructure applying the services indicated in the service graph to network traffic from a particular source EPG to a particular destination EPG. For example, the network infrastructure may route the network traffic, from the particular source EPG to the particular destination EPG, to the services as defined by the service graph with which the group policy is associated.

With reference to an inventory of services, which may be built as the service instances register with the network, a service insertion technique may be employed to indicate, in the service graphs, to which edge device of a network—such as, for example, tunnel routers or virtual Local Area Network (VxLAN) tunnel endpoints—each service instance indicated in the service graph is attached.

Furthermore, the service insertion technique may be employed to decompose a service graph into location-specific sets of traffic steering indications for each of the edge devices to which a service instance indicated in the service graph is attached. Thus, for example, this may result in a location-specific set of traffic steering indications for each of the edge devices, per service graph. The traffic steering indications may be, for example, a sequence of source-based next hop sequences to be carried out by each edge device as network traffic is directed to and/or processed by the edge device. In some examples, a source may be either a tunnel or a locally attached service instance. The first source at each location/edge device is typically a tunnel, unless the source of the network traffic is directly attached to the edge device.

The service insertion technique may be employed to define a master policy matrix of service graphs. For example, the network may be configured with a network configuration management console, via which a network administrator may define the master policy matrix of service graphs for the network. The master policy matrix of service graphs for the network may have an entry, for a particular endpoint group (EPG) pair of network nodes, in which a service graph is indicated. For example, an EPG of network nodes may indicate a group of edge devices having some common characteristic. An EPG pair may indicate a source EPG and a destination EPG. The service graph indicated for the EPG pair may indicate which service instances are to be applied to network traffic beginning at any network node in the indicated source EPG of the EPG pair and destinated for any network node in the indicated destination EPG of the EPG pair.

The service insertion techniques may be employed to generate, for each edge device, a location-specific policy matrix that indicates, for particular EPG pairs of edge devices, the location-specific set of traffic steering indications correspond to that particular EPG pair for that particular edge device location. For example, the master policy matrix may indicate, for each EPG pair of edge devices, what service graph is to be applied to that EPG. The service graphs, as discussed above, may be decomposed into location-specific sets of steering indications. The locations-specific policy matrix for a particular edge device may indicate, for each EPG pair, the service graph to be applied to that EPG pair of edge devices and the node-specific set of traffic steering indications for the service group that apply to that EPG pair of edge devices. In operation, each edge device associated with a service graph and an EPG pair of edge devices may resolve each steering indication in the location-specific sets of steering indications by requesting, from the map server or other inventory, a resolution of the steering indication to an addressable location, such as a port number or IP address. Decoupling of policy definition, policy disaggregation, service instance attachment and policy rendering may contribute to dynamism and elasticity in the service insertion techniques.

The map server or other inventory may, for example, operate according to a pull mechanism, such as in accordance with the Locator/ID Separation Protocol (LISP), defined in RFC 6830 ("The Locator/ID Separation Protocol (LISP)," dated January 2013). LISP is a routing and addressing architecture of the Internet Protocol. The LISP routing architecture addresses issues related to scaling, multihoming, inter-site traffic engineering, and mobility. An address on the Internet combines location (how the device is attached to the network) and identity semantics in a single 32-bit (IPv4 address) or 128-bit (IPv6 address) number. LISP separates the location from the identity. With LISP, where a device is (the network layer locator) in a network can change, but who a device is (the network layer identifier) in the network remains the same. LISP separates the end user device identifiers from the routing locators used by other devices to reach the end user devices. The LISP routing architecture design splits the device identity—that is, the endpoint identifier (EID)—from its location—that is, the routing locator (RLOC).

The LISP control plane has similarities to the Domain Name System (DNS). For example, DNS resolves a hostname of a device to an IP address, so that other devices can communicate with the device over an IP network. LISP, on the other hand, resolves an EID to an RLOC. With traditional IP routing, in the routing table is populated with IP prefixes. LISP does not populate the routing able with EID-prefixes. Rather, LISP uses a distributed mapping system where EIDs are mapped to RLOCs. An RLOC, for example, may be an IPv4 or IPv6 address. These mappings are stored in a distributed EID-to-RLOC database. When an ingress tunnel router (ITR) needs to find an RLOC address for a particular EID, it sends a Map-Request query including the EID to the mapping system of the LISP protocol.

FIG. 1 is a diagram illustrating an example network fabric 100 in which edge devices 102 (labeled in FIG. 1 as V1, V2, V3, V4 and V5) are connected to servers 104 of a network core 106. The edge devices 102 may be referred to, for example, as tunnel routers. The tunnel routers may be referred to as "xTRs," where "x" may be "E" for an egress tunnel router, and "x" may be "I" for an ingress tunnel router. In some examples, in a Virtual Extensible Local Area Network (VXLAN) type of environment, an edge device may be referred to as a VTEP (VXLAN Tunnel End Point).

The edge devices 102 may have services attached thereto. For example, the V2 edge device 102 may have an attached service identified by a "distinguished name" as $S_{12}$. A distinguished name may be thought of as a string that uniquely identifies an entry in a directory database. Referring still to the example network fabric 100, the V3 edge device 102 may have an attached service identified by a distinguished name as $S_{13}$, and the V4 edge device 102 may have two attached services, identified by a distinguished name as $S_{21}$ and by a distinguished name as $S_{22}$, respectively. In an example, the V1 edge device 102 may be source ("S") of network traffic, and the V5 edge device 102 may be a destination ("D") of the network traffic from the V1 edge device 102.

The network core 106 may be operating according to the LISP protocol. For example, the network core 106 may maintain a map server 108. As a service (such as the $S_{12}$ service, the $S_{11}$ service, the $S_{21}$ service or the $S_{22}$ service) attaches to an edge device 102, the service may register with the network core 106. As a result, the network core 106 may maintain an indication of the registering service in a mappings database 110 of the map server 108. For example, each service entry in the mappings database 110 may indicate the distinguished name of the edge device 102 to which the registering service is attached and may also indicate the attachment point (e.g., port number) of the registering service to the edge device 102.

As illustrated in FIG. 1, the mappings database 110 includes an entry for the registering service $S_{xx}$. The entry for the registering service $S_{xx}$ correlates the service $S_{xx}$ to the VX edge device 102 to which it is attached as well as to the attachment point of the service $S_{xx}$ on the VX edge device 102. For example, for the registering service $S_{11}$, the entry in the mappings database 110 may correlate the service $S_{11}$ to the V3 edge device 102 as well as to the attachment point (e.g., port 10) of the service $S_{11}$ to the V3 edge device 1.

The network fabric 100 also includes a policy engine 112. The policy engine 112 is the engine behind ensuring, based on various service insertion policies, that network traffic from a particular source edge device (such as network traffic from the V1 edge device, labelled as "S") to a particular destination edge device (such as network traffic to the V5 edge device, labelled as "D") is provided to various services as the network traffic flows between the source edge device and the destination edge device. In some examples, a source edge device and/or a destination edge device has at least one of the various services attached to it.

The policy engine 112 may implement the various service insertion policies by, at least in part, instantiating individualized location-specific matrices on the source edge device and on the edge devices to which the services to be applied are attached. The individualized location-specific matrices may be based at least in part on a service insertion policy in a master policy matrix 114. Each of the source edge device and the edge devices to which the services to be applied are attached may have one or more processors that process the individualized location-specific matrices instantiated on that device, to appropriately steer network traffic according to the individualized location-specific matrix for that edge device. The source edge device and the edge devices to which the services to be applied are attached thus may collectively implement the service insertion policy in the master policy matrix 114. In some examples, the service insertion policies in the master policy matrix 114 may be defined with endpoint groups (EPGs) of source edge devices and/or of destination edge devices, as opposed to being defined on the basis of individual source edge devices and/or on the basis of individual destination edge devices.

Figure 2:
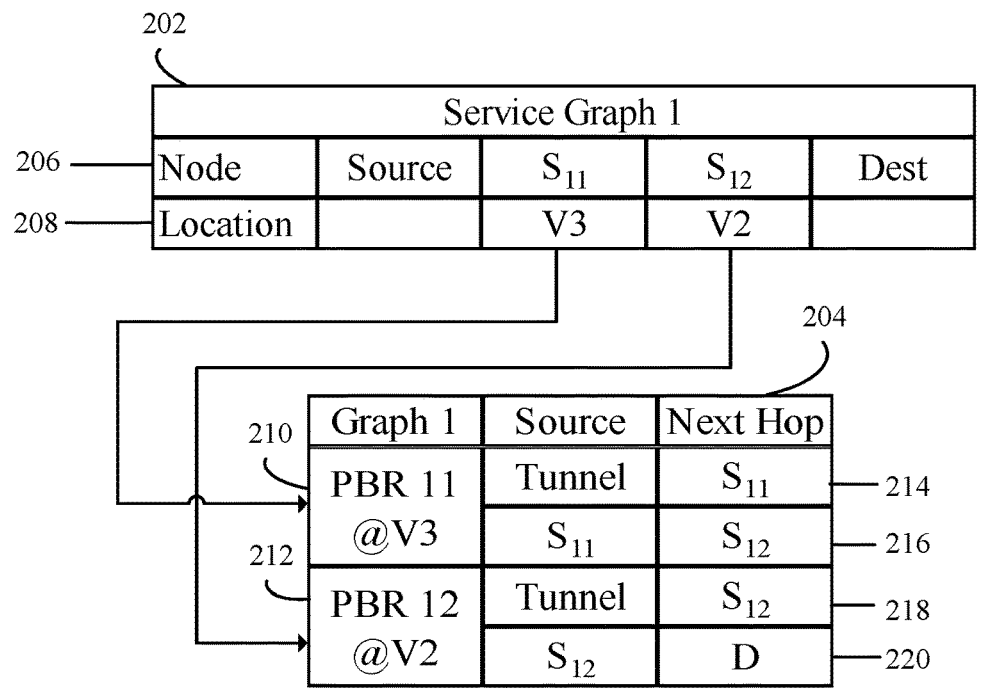
FIG. 2 is a diagram illustrating an example service graph configuration, including an overall service graph template and a lower level service graph.

FIG. 2 illustrates an example service graph configuration 200, including an overall service graph template 202 and a lower level service graph 204. The service graph template 202 indicates which service nodes (and in which order) are to be inserted between a generic source and destination. The "node" row 206 of the service graph template 202 may be populated, for example, based on input from a network administrator via a management console of the network fabric. The service graph template 202 indicates each service node in the "node row" 206 using a distinguished name for each service node. For example, each service entry in the mappings database 110 (FIG. 1) may indicate the distinguished name of the edge device 102 to which the registering service is attached. For each service node in the node row 206, the location row 208 may indicate a corresponding service node distinguished name.

In the example service graph template 202, the service nodes (from "Source" edge device to "Destination" end node device) are indicated in the "Node" row 206 of the service graph template 202, in order, by the distinguished name $S_{11}$ and the distinguished name $S_{12}$. The "Location" row 208 of the example service graph template 202, populated using the mappings database 110 of the network fabric 100, for example, includes the node location distinguished name V3 in correspondence to the service node distinguished name $S_{11}$ and includes the node location distinguished name V2 in correspondence to the service node distinguished name $S_{12}$.

Referring still to FIG. 2, the lower level service graph template 204 corresponds to the overall service graph template 202, and provides lower-level traffic steering instructions. A first portion 210 of the lower level service graph template 204, indicated as "PBR 11 @V3," corresponds to the steering instructions to be carried out at the V3 edge device 102 as a portion of accomplishing the service insertion indicated in the overall service graph template 202. The designation "PBR" may be used to indicate that the steering instructions are akin to policy-based routing, or PBR. A second portion 212 of the lower level service graph 204, indicated as "PBR 12 @ V2," corresponds to the steering instructions to be carried out at the V2 edge device 102 as another portion of accomplishing the service insertion indicated in the overall service graph template 202.

The first portion 210 of the lower level service graph template 204 includes a first sub-portion 214 and a second sub-portion 216. The second portion 212 of the lower-level service graph template 204 includes a first sub-portion 218 and a second sub-portion 220. The first sub-portion 214 of the first portion 210 indicates a first steering instruction to be carried out by the V3 edge device 102 in the process of accomplishing the service insertion indicated in the overall service graph template 202. The second sub-portion 216 of the first portion 210 indicates a second steering instruction to be carried out by the V3 edge device 102 in the process of accomplishing the service insertion indicated in the overall service graph template 202. The first sub-portion 218 of the second portion 212 indicates a first steering instruction to be carried out by the V2 edge device 102 in the process of accomplishing the service insertion indicated in the overall service graph template 202. The second sub-portion 220 of the second portion 212 indicates a second steering instruction to be carried out by the V2 edge device 102 in the process of accomplishing the service insertion indicated in the overall service graph template 202.

More specifically, the first sub-portion 214 of the first portion 210 indicates that network traffic received from the ingress tunnel (i.e., from external to the V3 edge device 102) is to be provided to the attachment point for the $S_{11}$ service. The attachment point for the Su service is indicated by the distinguished name for the $S_{11}$ service and may be resolved by the V3 edge device 102 to a lower-level indication of the attachment point, such as to a port number of the V3 edge device 102.

The second sub-portion 216 of the first portion 210 indicates that network traffic received from the attachment point for the $S_{11}$ service is to be provided to the $S_{12}$ service. The attachment point for the $S_{11}$ service and the attachment point for the $S_{12}$ service are indicated by the distinguished name for the $S_{11}$ service and for the $S_{12}$ service, respectively, and may be resolved by the V3 edge device 102 to a lower-level indication of the respective attachment point, such as to a port number of the V3 edge device 102. For example, the lower-level indication of the attachment point for the $S_{12}$ service may resolve to the egress tunnel from the V3 edge device 102, since the $S_{12}$ service is not attached to the V3 edge device 102.

The first sub-portion 218 of the second portion 212 indicates that network traffic received from the ingress tunnel (i.e., from external to the V2 edge device 102) is to be provided to the attachment point for the $S_{12}$ service. The attachment point for the $S_{12}$ service is indicated by the distinguished name for the $S_{12}$ service, and may be resolved by the V2 edge device 102 to a lower-level indication of the attachment point, such as to a port number of the V2 edge device 102.

The second sub-portion 220 of the second portion 212 indicates that network traffic received from the attachment point for the $S_{12}$ service is to be provided to D, the destination of the network traffic. The attachment point for the $S_{12}$ service and for the destination are indicated by the distinguished name for the $S_{12}$ service and for the destination, respectively, and may be resolved by the V2 edge device 102 to a lower-level indication of the respective attachment point, such as to a port number or egress tunnel of the V2 edge device 102.

Figure 3:
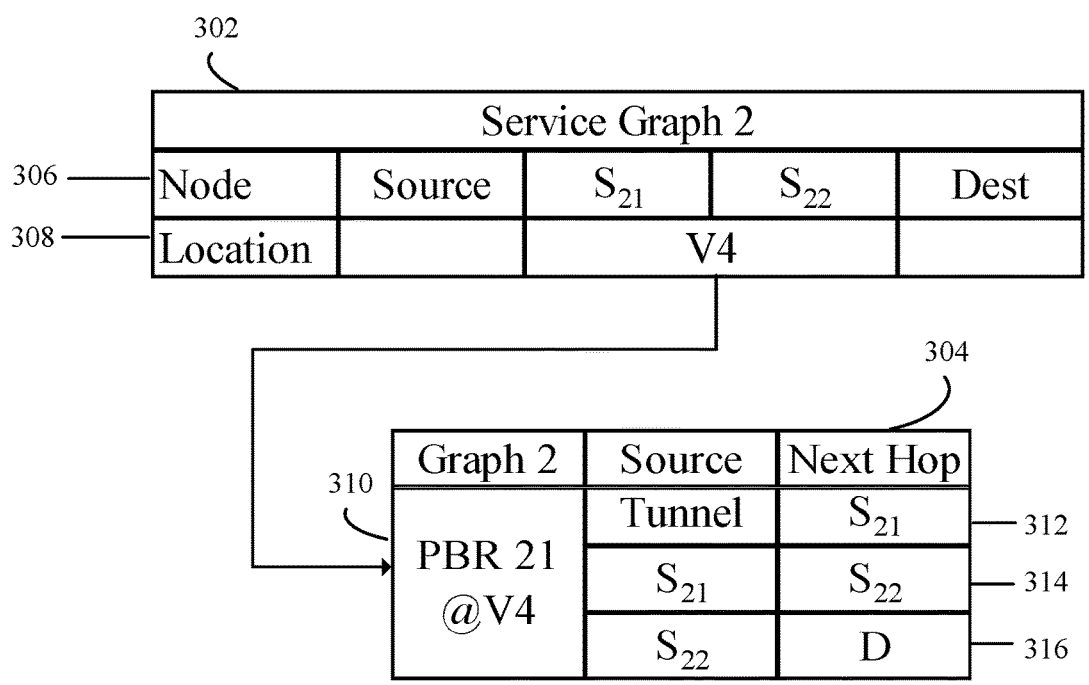
FIG. 3 is a diagram illustrating a second example service graph configuration, including an overall service graph template and a lower level service graph.

FIG. 3 illustrates an example service graph configuration 300, including an overall service graph template 302 and a lower level service graph 304. The service graph template 302 indicates which service nodes (and in which order) are to be inserted between a generic source and destination. The "node" row 306 of the service graph template 302 may be populated, for example, based on input from a network administrator via a management console of the network fabric. The service graph template 302 indicates each service node in the "node row" 306 using a distinguished name for each service node.

In the example service graph template 302, the service nodes (from "Source" edge device to "Destination" end node device) are indicated in the "Node" row 306 of the service graph template 302, in order, by the distinguished name $S_{21}$ and the distinguished name $S_{22}$. The "Location" row 308 of the example service graph template 302, populated using the mapping database of the network fabric, for example, includes the node location distinguished name V4 in correspondence to both the service node distinguished name $S_{21}$ and to the service node distinguished name $S_{22}$.

Referring still to FIG. 3, the lower level service graph template 304 corresponds to the overall service graph template 302, but provides lower-level traffic steering instructions. A first portion 310 of the lower level service graph template 304, indicated as "PBR 21 @V4," corresponds to the steering instructions to be carried out at the V4 edge device 102 as a portion of accomplishing the service insertion indicated in the overall service graph template 302. The lower level service graph template 304 includes only one portion, since all of the services indicated in the overall service graph template 302 ($S_{21}$ and $S_{22}$) are attached to the same edge device, the V4 edge device 102.

The first portion 310 of the lower level service graph template 304 includes a first sub-portion 312, a second sub-portion 314 and a third sub-portion 316. The first sub-portion 312 of the first portion 310 indicates a first steering instruction to be carried out by the V4 edge device 102 in the process of accomplishing the service insertion indicated in the overall service graph template 302. The second sub-portion 314 of the first portion 310 indicates a second steering instruction to be carried out by the V4 edge device 102 in the process of accomplishing the service insertion indicated in the overall service graph template 302. The third sub-portion 316 of the first portion 310 indicates a third steering instruction to be carried out by the V4 edge device 102 in the process of accomplishing the service insertion indicated in the overall service graph template 302.

More specifically, the first sub-portion 312 of the first portion 310 indicates that network traffic received from the ingress tunnel (i.e., from external to the V4 edge device 102) is to be provided to the attachment point for the $S_{21}$ service. The attachment point for the $S_{21}$ service is indicated by the distinguished name for the $S_{21}$ service, and may be resolved by the V4 edge device 102 to a lower-level indication of the attachment point, such as to a port number of the V4 edge device 102.

The second sub-portion 314 of the first portion 310 indicates that network traffic received from the attachment point for the $S_{21}$ service is to be provided to the $S_{22}$ service. The attachment point for the $S_{21}$ service and for the $S_{22}$ service are indicated by the distinguished name for the $S_{21}$ service and for the $S_{22}$ service, respectively, and may be resolved by the V4 edge device 102 to a lower-level indication of the respective attachment point, such as to a port number of the V4 edge device 102.

The third sub-portion 316 of the first portion 310 indicates that network traffic received from the attachment point for the $S_{22}$ service is to be provided to D, the destination of the network traffic. The attachment point for the $S_{22}$ service and for the destination are indicated by the distinguished name for the $S_{22}$ service and for destination, respectively, and may be resolved by the V4 edge device 102 to a lower-level indication of the respective attachment point, such as to a port number or egress tunnel of the V4 edge device 102.

A PBR may be generated by an algorithm such as:
Evaluate_master_service_graph( );
Tunnel_to_first_service_node(src,dest,input_intf);
  Send_to_service_node(src,dest,input_intf);
  while(next_node_local(src,dest,input_intf)) {
    send_to_service_node(src,dest,input_intf);
  }
  Tunnel_to_next_service_node(src,dest,input_intf);
  /* Repeat the above steps for the next service node */

Figure 4:
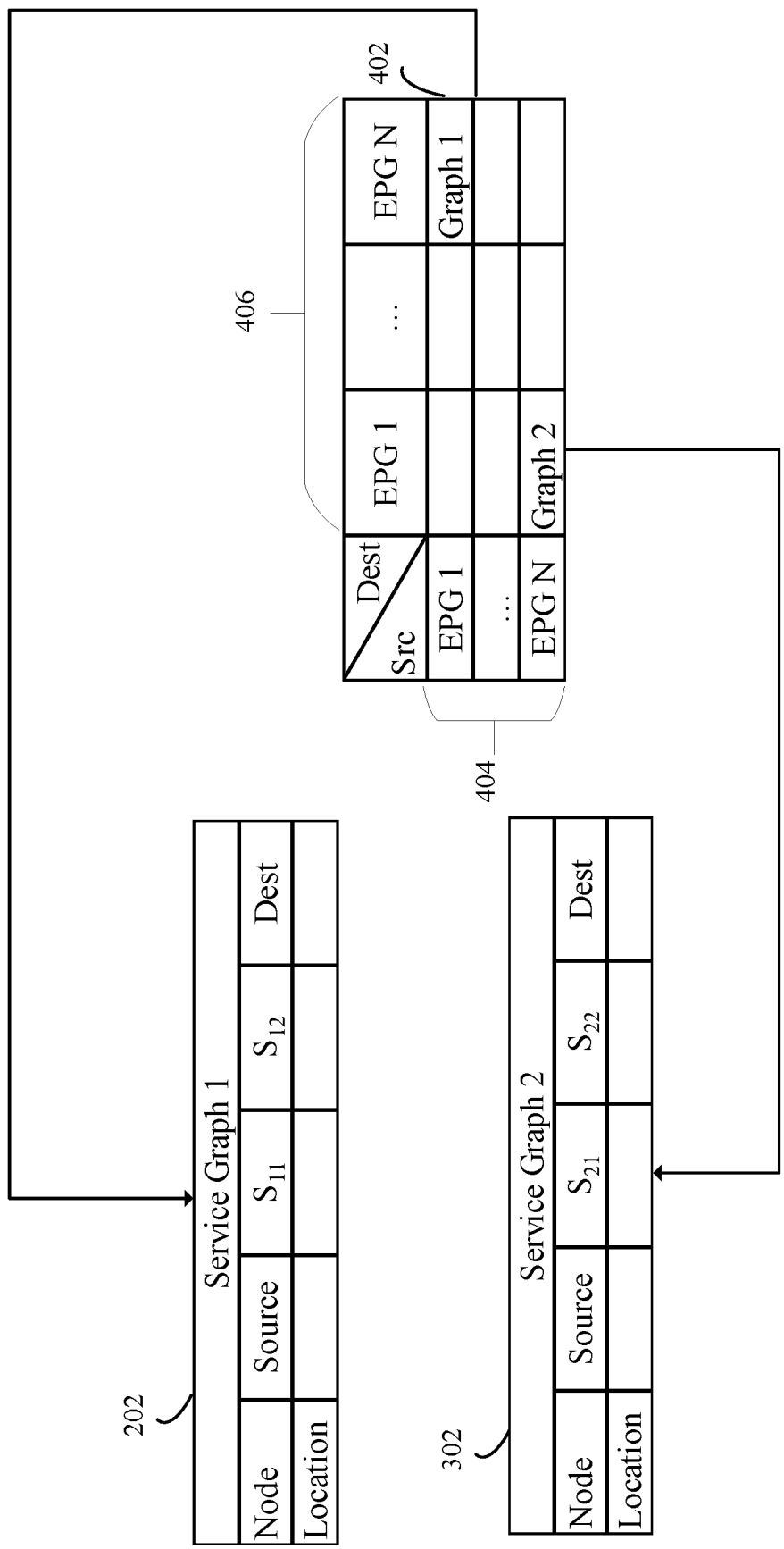
FIG. 4 is a diagram illustrating how the overall service graph template and the second overall service graph template may be utilized to define a master policy matrix.

FIG. 4 illustrates how the overall service graph template 202 and the overall service graph template 302 may be utilized, such as by a network administrator accessing a management console for the network fabric, to define a master policy matrix 402. The master group policy captured in the master policy matrix 402 is a master policy template that may provide a complete end-to-end view/intent of the policy author (e.g., network administrator): e.g., 1 communicates with N with services inserted according to the overall service graph template 202, and N communicates with 1 via with services inserted according to the overall service graph template 302. The "1" and "N" referred to in the previous sentence may be EPGs, where the EPGs are groupings of application endpoints, for example.

For example, the master policy matrix 402 may indicate source endpoint groups 404 along a vertical axis, and the master policy matrix 402 may indicate destination endpoint groups 406 along a horizontal axis. Each pair of source endpoint group 404 and destination endpoint group 406 may indicate a particular overall service graph template, such as the overall service graph template 202 or the overall service graph template 302. In the FIG. 4 example, the pair of EPG 1 as source endpoint group and EPGN as destination endpoint group indicates the overall service graph template 202. The pair of EPGN as source endpoint group and EPG 1 as destination endpoint group indicates the overall service graph template 302. The example master policy matrix 402 illustrated in FIG. 4 is sparsely populated. In other examples, each of many, most or all pairs of source EPG and destination EPG may have a corresponding overall service graph template indicated for the pair.

Figure 5:
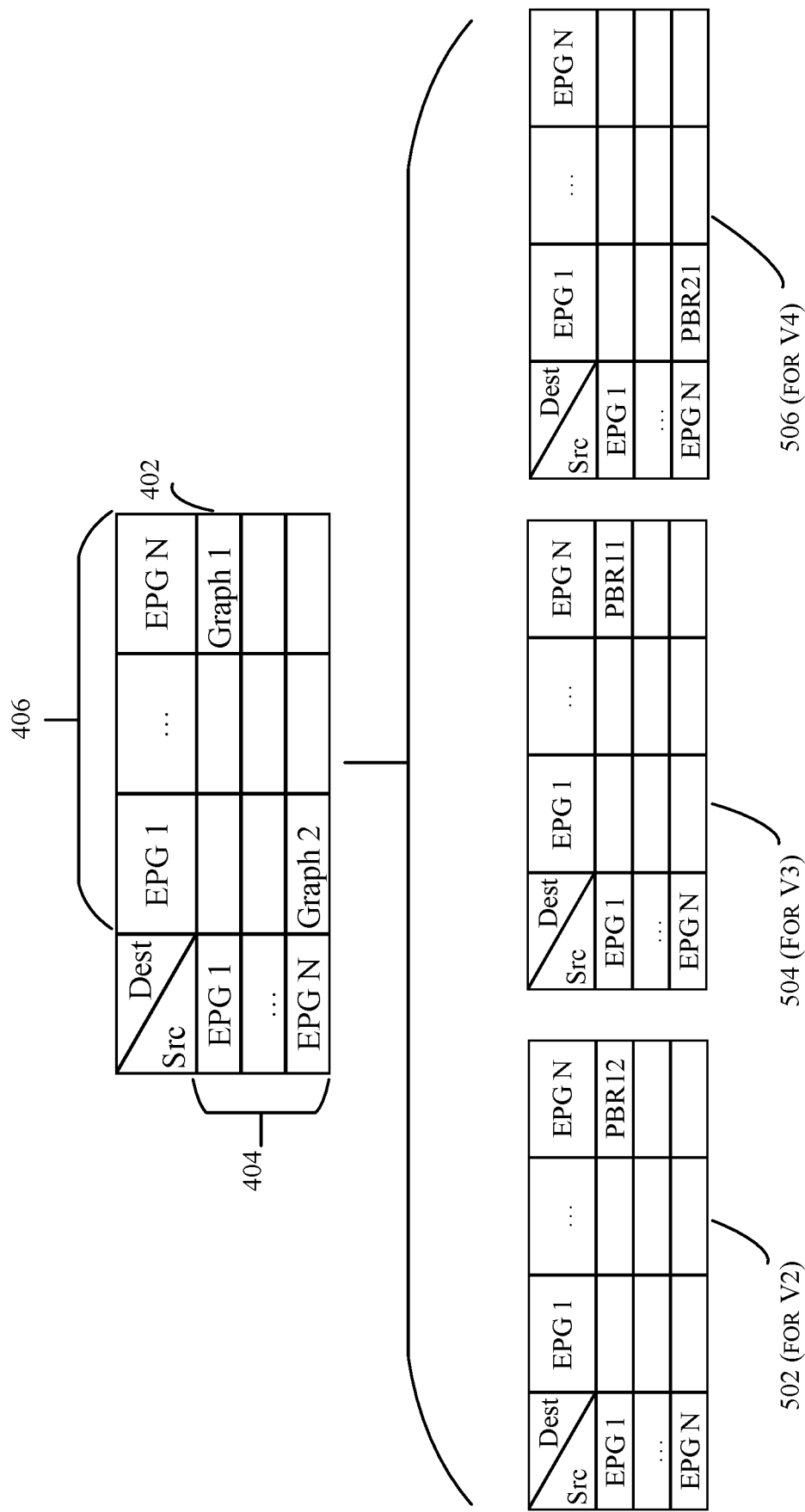
FIG. 5 is a diagram illustrating a master policy matrix disaggregated into a location-specific policy matrix for each edge device to which a to-be inserted service is attached.

As illustrated in FIG. 5, with an overall service insertion policy designated for a network fabric in a master policy matrix, the master policy matrix may be disaggregated into a location-specific policy matrix for each edge device to which a to-be inserted service is attached. For example, each location-specific matrix may indicate traffic-steering directives specific to the corresponding stage (edge device) of the service chain. Thus, for example, a location-specific matrix may be specific to an edge device that provides connectivity to a network service node (i.e. the VTEP or XTR to which the service nodes attach), thus "location" in this context may refer to the edge device to which the services are connected. Each location-specific matrix may hold detailed traffic steering policies for the corresponding edge device in order to realize the associated service graph. The traffic steering policies in the location-specific matrices may be organized in a source/destination group matrix that matches the source/destination group organization in the master policy matrix.

Referring to FIG. 5, the master policy matrix 402 is disaggregated into a location-specific matrix 502 corresponding to the V2 edge device 102; into a location-specific matrix 504 corresponding to the V3 edge device 102; and into a location-specific matrix 506 corresponding to the V4 edge device 102. Each of the location-specific matrix 502, the location-specific matrix 504 and the location-specific matrix 506 indicate traffic steering policies (indirectly, via the designation of, for example, PBR 12, PBR11 and PBR21) organized in a source/destination group matrix that matches the source/destination group organization in the master policy matrix 402.

Thus, for example, referring to the portion of the master policy matrix 402, for the source EPG and destination EPG pair of EPG 1 and EPG N, respectively, the master policy matrix 402 indicates the overall service graph template 202 ("Graph 1") is the corresponding overall service graph template. In the location-specific matrix 502, for the V2 edge device 102, the PBR12 steering instructions are designated to correspond to the source EPG and destination EPG pair. The PBR 12 steering instructions are shown in FIG. 2 as the second portion 212 of the lower level service graph 204, indicated symbolically as "PBR 12 @ V2," corresponding to the steering instructions to be carried out at the V2 edge device 102 as a portion of accomplishing the service insertion indicated in the overall service graph template 202. As shown in FIG. 2, the second portion 212 includes the first sub-portion 218 and the second sub-portion, which indicate the steering instructions of which PBF12 @ V2 is comprised, using distinguished names.

Furthermore, in the location-specific matrix 504, for the V3 edge device 102, the PBR 11 steering instructions are designated to correspond to the source EPG and destination EPG pair of source EPG 1 and destination EPG N. The PBR 11 steering instructions are shown in FIG. 2 as the first portion 210 of the lower level service graph 204, indicated symbolically as "PBR 11 @ V3," corresponding to the steering instructions to be carried out at the V3 edge device 102 as a portion of accomplishing the service insertion indicated in the overall service graph template 202. As shown in FIG. 2, the first portion 210 includes the first sub-portion 214 and the second sub-portion 216, which indicate the steering instructions of which PBF11 @ V3 is comprised, using distinguished names.

In the location-specific matrix 506, for the for the V4 edge device 102, there are no steering instructions designated to correspond to the source EPG and destination EPG pair of source EPG 1 and destination EPG N. That is, none of the services indicated in the overall service graph template 202 are attached to the V4 edge device 102.

Taking the portion of the master policy matrix 402, for the source EPG and destination EPG pair of EPGN and EPG 1, respectively, the master policy matrix 402 indicates the overall service graph template 302 ("Graph 2") is the corresponding overall service graph template. In the location-specific matrix 502, for the V2 edge device 102, there are no steering instructions designated to correspond to the source EPG and destination EPG pair of source EPG N and destination EPG 1. That is, none of the services indicated in the overall service graph template 302 are attached to the V2 edge device 102. Likewise, in the location-specific matrix 504, for the V3 edge device, there are no steering instructions designated to correspond to the source EPG and destination EPG pair of source EPG N and destination EPG 1. That is, none of the services indicated in the overall service graph template 302 are attached to the V3 edge device 102.

In the location-specific matrix 506, for the V4 edge device 102, the PBR21 steering instructions are designated to correspond to the source EPG and destination EPG pair. The PBR 21 steering instructions are shown in FIG. 3 as the first portion 310 of the lower level service graph 304, indicated symbolically as "PBR 21 @ V4," corresponding to the steering instructions to be carried out at the V4 edge device 102 as a portion of accomplishing the service insertion indicated in the overall service graph template 302. As shown in FIG. 3, the first portion 310 indicates the steering instructions of which PBR21 @ V4 is comprised, using distinguished names.

FIG. 6, FIG. 7 and FIG. 8 show examples 600, 700 and 800 of the location specific PBRs 210, 212 and 310, respectively, and with the lower level traffic steering resolved. For example, the lower-level traffic steering may be resolved by each edge device 102 having a to-be-inserted service attached (i.e., the V2 edge device, the V3 edge device and the V4 edge device) requesting, from the map server 108 of the network core 106, the resolution of the service distinguished name, or other distinguished name, to the attachment point. Each service may have registered with the map server 108 upon attaching to the respective node 102, the registration including at least the distinguished name of the service correlated to the attachment point on the node to which the service is attached.

Referring to the FIG. 6 example location specific PBR 600 with lower-level traffic steering resolved, the source 602 of "tunnel" from the location specific PBR 210 resolves to "tunnel" in the FIG. 6 example. The next hop 604 of $S_{11}$ from the location specific PBR 210 resolves to Port 10. The source 606 of $S_{11}$ from the location specific PBR 210 resolves to Port 10, and the next hop 608 of "$S_{12}$" resolves to "tunnel," since the $S_{12}$ service is not attached to the V3 edge device 102. Thus, for example, referring to the FIG. 4 master policy matrix 402, network traffic that has a source in EPG 1 and a destination in EPG N is to have services inserted according to overall service graph template 202. As illustrated in FIG. 2, the overall service graph template 202 disaggregates, in part, into a first portion 210 of the lower level service graph template 204, indicated as "PBR 11 @V3," which corresponds to the steering instructions to be carried out at the V3 edge device 102 as a portion of accomplishing the service insertion indicated in the overall service graph template 202.

Referring to the FIG. 7 example location specific PBR 700 with lower-level traffic steering resolved, the source 702 of "tunnel" from the location specific PBR 212 resolves to next hop of "tunnel" in the FIG. 7 example. The next hop 704 of $S_{12}$ from the location specific PBR 212 resolves to Port 9. The source 706 of $S_{12}$ from the location specific PBR 212 resolves to Port 9, and the next hop 708 of "D" resolves to "tunnel." Thus, for example, referring to the FIG. 4 master policy matrix 402, network traffic that has a source in EPG 1 and a destination in EPG N is to have services inserted according to overall service graph template 202. As illustrated in FIG. 2, the overall service graph template 202 disaggregates, in part, into a second portion 212 of the lower level service graph template 204, indicated as "PBR 12 @V2," which corresponds to the steering instructions to be carried out at the V2 edge device 102 as a portion of accomplishing the service insertion indicated in the overall service graph template 202.

Referring to the FIG. 8 example location specific PBR 800 with lower-level traffic steering resolved, the source 802 of "tunnel" from the location-specific PBR 310 resolves to "tunnel" in the FIG. 8 example. The destination 804 of $S_{21}$ from the location-specific PBR 310 resolves to Port 8, as does the source 806 of $S_{21}$ from the location-specific PBR 310 resolve to Port 8. The destination 808 of $S_{22}$ from the location specific PBR 310 resolves to "Port 10" in the FIG. 8 example, as does the source 810 of $S_{22}$ from the location specific PBR 310 resolve to Port 10. Finally, the destination 812 of "D" from the location specific PBR 310 resolves to "tunnel" in the FIG. 8 example.

Following through with the FIG. 6 example location specific PBR 600 with lower-level traffic steering resolved and the FIG. 7 example location specific PBR 700 with lower-level traffic steering resolved, these two example location specific PBRs indicate how network traffic originating in EPG 1 and destined to EPG N (corresponding to overall service graph template 202 and a lower level service graph 204 per the master policy matrix 402) is steered at a low level in each of V3 edge device 102 and V2 edge device 102, respectively, to accomplish the appropriate service insertion.

For example, with respect to the FIG. 6 example location specific PBR 600 with lower-level traffic steering resolved and the FIG. 7 example location specific PBR 700 with lower-level traffic steering resolved, at the V3 edge device 102 (referring first to the FIG. 7 PBR 700, instantiated in the V3 edge device 102), network traffic from the tunnel (702), meaning the network traffic is originating from outside the V3 edge device 102, is provided to next hop of Port 9 (704), where the $S_{12}$ service is applied. Network traffic from Port 9 (706) is provided to next hop of tunnel (708). At the V2 edge device (referring to the FIG. 6 PBR 600, instantiated in the V2 edge device 102), network traffic from the tunnel (602), is provided to the next hop of Port 10 (604), wherein the $S_{11}$ service is applied. Network traffic from Port 10 (606) is provided to next hop of tunnel (608).

Furthermore, the FIG. 8 example location specific PBR 800 with lower-level traffic steering resolved indicates how network traffic originating in EPG N and destined to EPG 1 (corresponding to overall service graph template 302 and lower-level service graph 310 per the master policy matrix 402) is steered at a low level in the V4 edge device 102 to accomplish the appropriate service insertion. At V4 edge device 102 (referring to the FIG. 8 PBR 800, instantiated in the V4 edge device 102), network traffic from the tunnel (802), meaning the network traffic is originating from outside the V4 edge device 102, is provided to next hop of Port 8 (804), where the $S_{21}$ service is applied. Network traffic from Port 8 (806) is provided to next hop of Port 10 (808), where the $S_{22}$ service is applied. Network traffic from Port 10 (810) is provided to next hop of tunnel (812).

Figure 9:
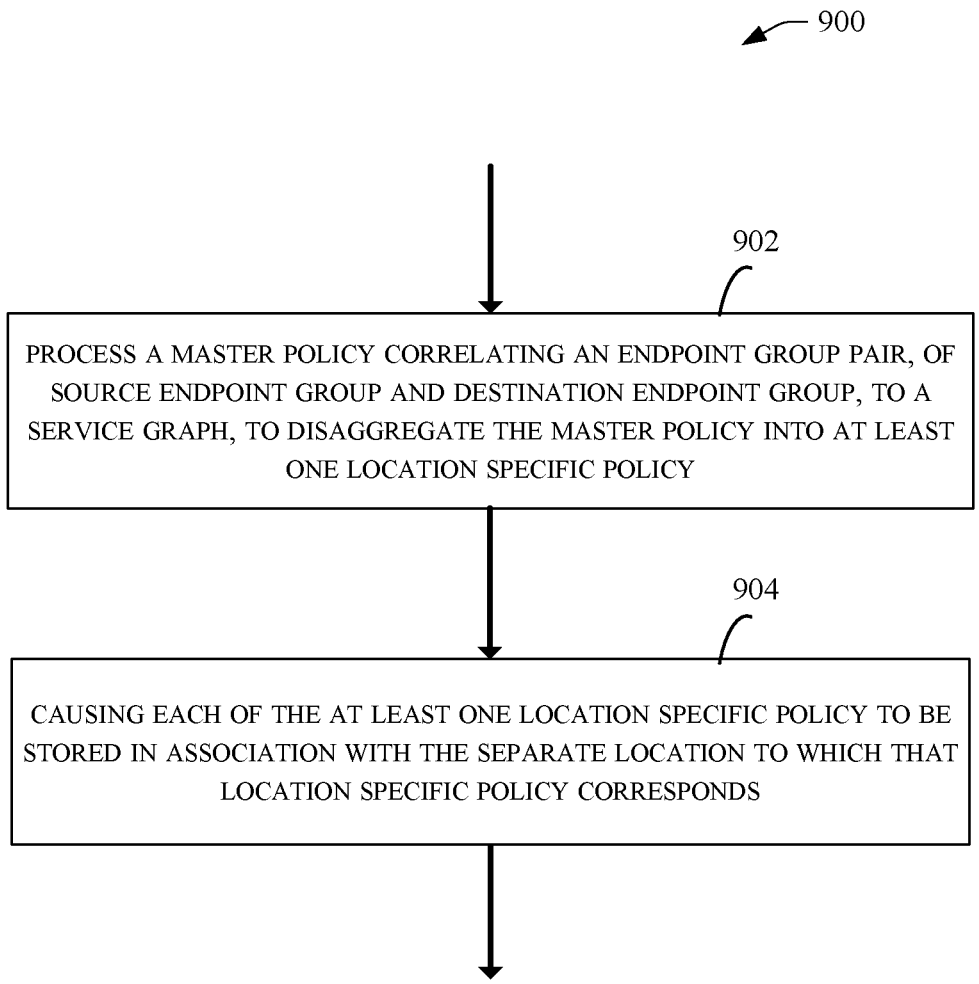
FIG. 9 is a flowchart illustrating a method that may be carried out to configure a network for service insertion.

FIG. 9 is a flowchart illustrating a method 900 that may be carried out to configure a network for service insertion. The network may include, for example, a network fabric in which edge devices are connected to servers of a network core. The edge devices may have attached services, each of which may be referred to by a distinguished name.

The method 900 includes, at 902, processing a master policy correlating an endpoint group pair, of source endpoint group and destination endpoint group, to a service graph. For example, the service graph may be a template service chain, and the template service chain may indicate an ordering of a plurality of services. For example, the service graph may be generated as a result of user input to a management console of a network fabric. Processing the master policy may include disaggregating the master policy into at least one location specific policy, where each of the at least one location specific policy corresponds to a separate location in the network and including traffic steering directives corresponding to a portion of the plurality of services associated with the separate location.

The method further includes, at 904, causing each of the at least one location specific policy to be stored in association with the separate location to which that location specific policy corresponds. For example, a processor of the control plane of the network fabric may cause a location specific policy to be stored at each location, such as an edge device of the network fabric, to which a to-be-inserted service, indicated in the service graph, is attached.

Figure 10:
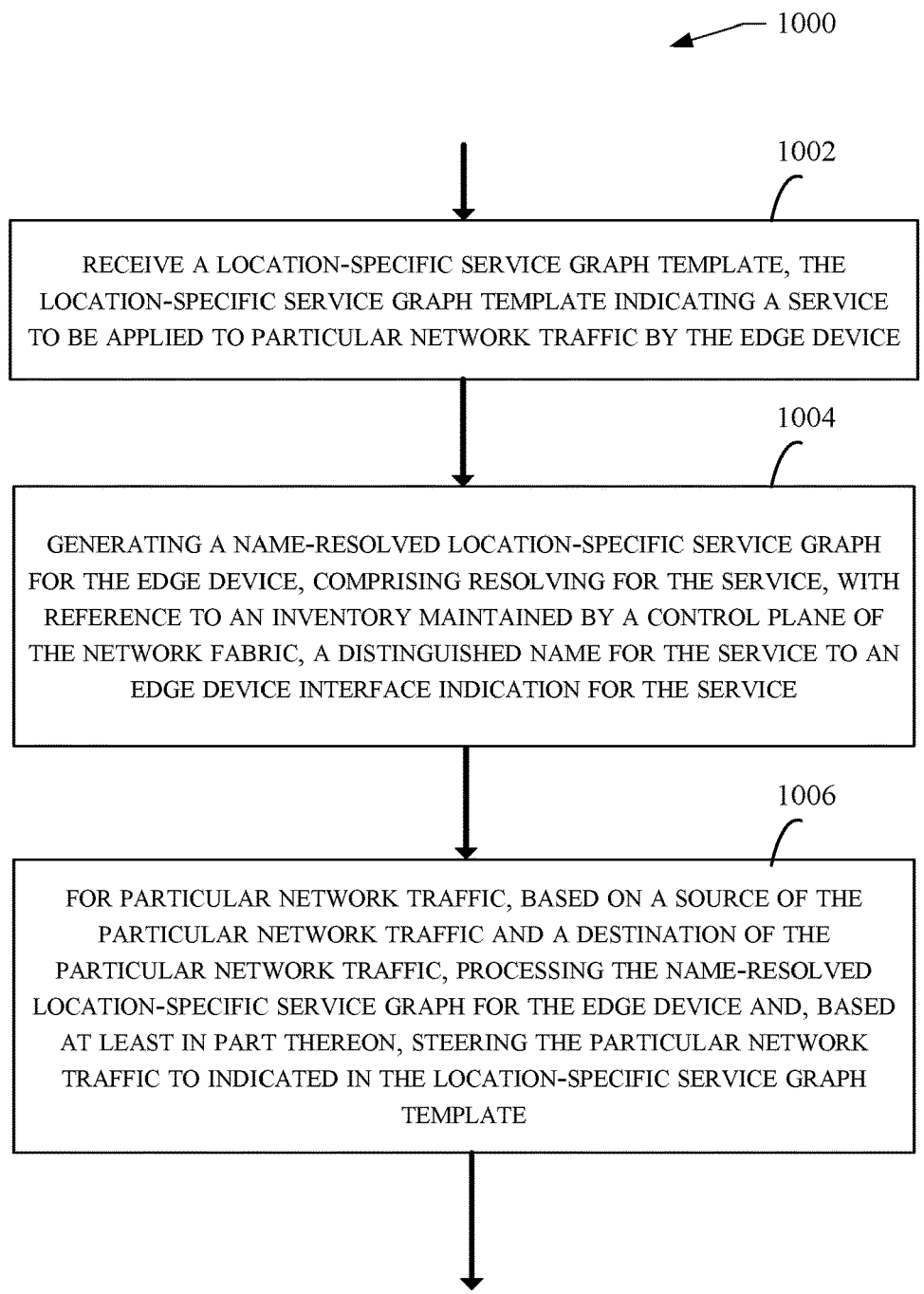
FIG. 10 is a flowchart illustrating a method that may be carried out by an edge device of a network to perform service insertion.

FIG. 10 is a flowchart illustrating a method 1000 that may be carried out by an edge device of a network to perform service insertion. At 1002, the edge device receives a location-specific service graph template. The location-specific service graph template indicates a service to be applied to particular network traffic by the edge device. For example, the edge device may receive the location-specific service graph template from a control plane of the network fabric.

At 1004, the edge device generates a name-resolved location-specific service graph for the edge device. Generating the name-resolved location-specific service graph includes resolving for the service, with reference to an inventory maintained by the control plane of the network fabric, a distinguished name for the service to an edge device interface indication for the service. For example, the inventory maintained by the control plane of the network fabric may have been generated and/or updated based at least in part on the service attaching to the edge device and registering with the control plane of the network fabric.

At 1006, the edge device applies the name-resolved location-specific service graph to particular network traffic. For example, based on a source of the particular network traffic and a destination of the particular network traffic, the edge device processes the name-resolved location-specific service graph for the edge device and, based at least in part thereon, steers the particular network traffic to the service indicated in the location-specific service graph template.

Figure 11:
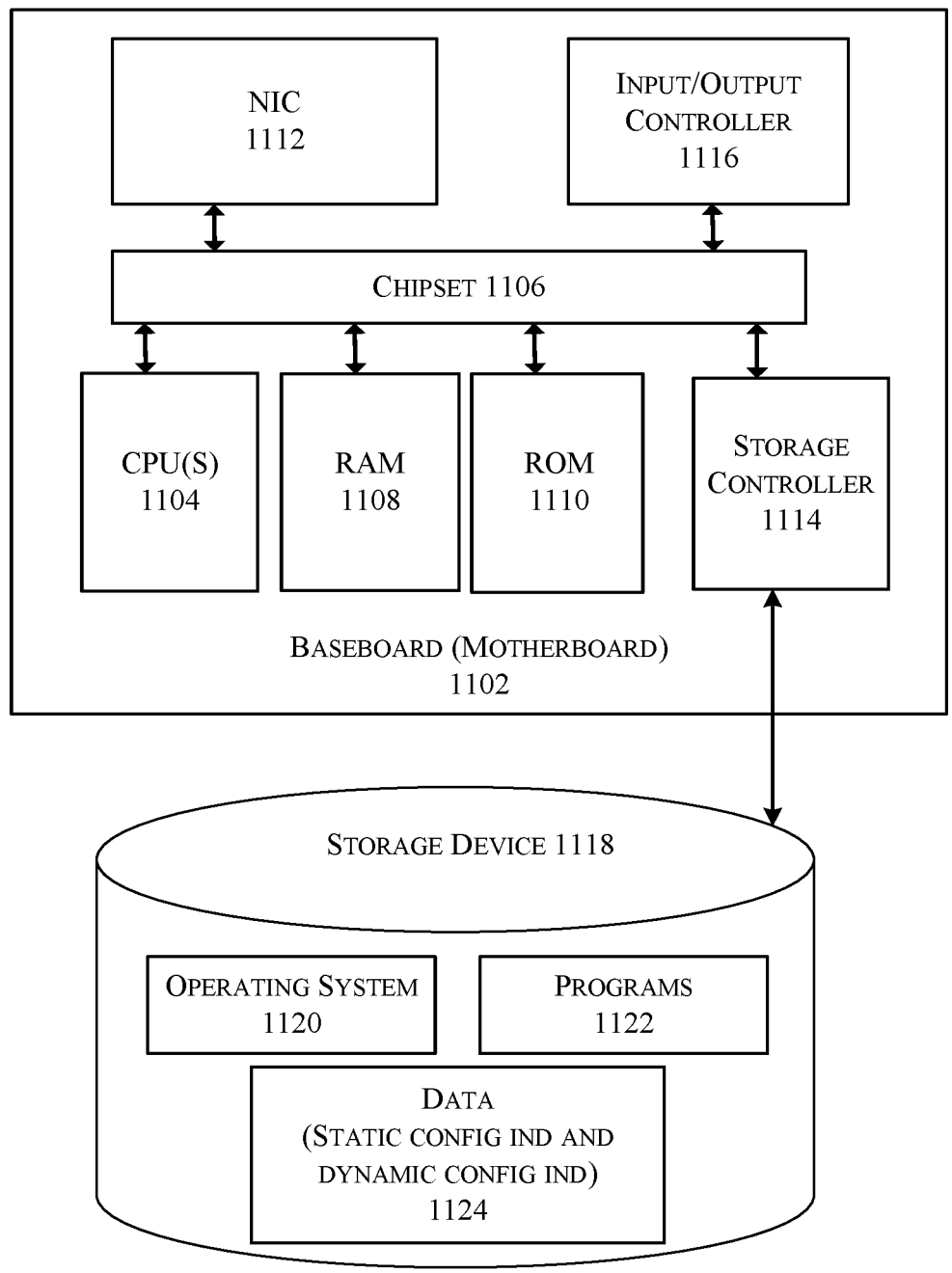
FIG. 11 illustrates an example computer architecture for a computer capable of executing program components for implementing the functionality described herein.

FIG. 11 illustrates an example computer architecture for a computer 1100 capable of executing program components for implementing the functionality described above. The computer architecture shown in FIG. 11 illustrates an architecture of a server computer, workstation, desktop computer, laptop, tablet, network appliance, e-reader, smartphone, network switch, or other computing device, and can be utilized to execute any of the software components presented herein. The computer 1100 may, in some examples, correspond to a network infrastructure device discussed herein.

The computer 1100 includes a baseboard 1102, or "motherboard," which may be a printed circuit board to which a multitude of components or devices can be connected by way of a system bus or other electrical communication paths. In one illustrative configuration, one or more central processing units ("CPUs") 1104 operate in conjunction with a chipset 1106. The CPUs 1104 can be, for example, standard programmable processors that perform arithmetic and logical operations necessary for the operation of the computer 1100.

The CPUs 1104 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1106 provides an interface between the CPUs 1104 and the remainder of the components and devices on the baseboard 1102. The chipset 1106 can provide an interface to a RAM 1108, used as the main memory in the computer 1100. The chipset 1106 can further provide an interface to a computer-readable storage medium such as a read-only memory ("ROM") 1110 or non-volatile RAM ("NVRAM") for storing basic routines that help to startup the computer 1100 and to transfer information between the various components and devices. The ROM 1110 or NVRAM can also store other software components necessary for the operation of the computer 1100 in accordance with the configurations described herein. As illustrated in FIG. 11, the ROM 1110 or NVRAM can also store data usable by the computer 1100 to generate and/or process attestation information in messages exchanged among the computer 1100 and other devices. In other examples, this data may be stored elsewhere, such as in RAM 1108.

The computer 1100 can operate in a networked environment using logical connections to remote computing devices and computer systems through a network. For example, the chipset 1106 can include functionality for providing network connectivity through a Network Interface Controller (NIC) 1112, such as a gigabit Ethernet adapter. The NIC 1112 can connect the computer 1100 to other computing devices over a network. It should be appreciated that multiple NICs 1112 can be present in the computer 1100, connecting the computer to other types of networks and remote computer systems. In some instances, the NICs 1112 may include at least one ingress port and/or at least one egress port. An input/output controller 1116 may be provided for other types of input/output.

The computer 1100 can be connected to a storage device 1118 that provides non-volatile storage for the computer. The storage device 1118 can store an operating system 1120, programs 1122, and data 1124, for example. The storage device 1118 can be connected to the computer 1100 through a storage controller 1114 connected to the chipset 1106. The storage device 1118 can include one or more physical storage units. The storage controller 1114 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The data 1124 may include, for example, one or more static configuration indications and one or more dynamic configuration indications. The data 1124 may also include, for example, an indication of past media stream requests and/or information regarding demography and/or geography of media stream subscribers, a schedule of programs to be provided on media streams, such as special programming, by time and/or date.

The computer 1100 can store data on the storage device 1118 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 1118 is characterized as primary or secondary storage, and the like. For example, the computer 1100 can store information to the storage device 1118 by issuing instructions through the storage controller 1114 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1100 can further read information from the storage device 1118 by detecting the physical states or characteristics of one or more particular locations within the physical storage units.

In addition to the storage device 1118 described above, the computer 1100 can have access to other computer-readable storage media to store and retrieve information, such as program modules, data structures, or other data, including data to generate and/or process attestation information. It should be appreciated by those skilled in the art that computer-readable storage media is any available media that provides for the non-transitory storage of data and that can be accessed by the computer 1100.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A method of configuring a network fabric for service insertion, comprising operations of:
    identifying endpoints associated with a network fabric and services that execute service functions for traffic communicated between the endpoints and through the network fabric;
    generating a service graph that indicates a template service chain, the template service chain defining an ordering of a plurality of services;
    generating a master policy that indicates:
        (i) the service graph is to be applied for an endpoint group pair, the endpoint group pair including a source endpoint group and destination endpoint group; and
        (ii) locations in the network at which traffic communicated between the source endpoint group and the destination endpoint group is to be routed through the plurality of services;
    using the master policy determining traffic steering directives to be provided to network nodes at the locations in the network to route traffic through at least a portion of the plurality of services;
    providing the network nodes with respective traffic steering directives that instruct the network nodes to route the traffic through the plurality of services.

2. The method of claim 1, wherein a master service graph indicates the template service chain by distinguished names, the method further comprising:
    processing the master service graph with reference to an inventory of services maintained by a control plane of the network and that associates each of the plurality of services with a location to which that service is attached, to generate the service graph, wherein the service graph includes at least an indication, for each location, of the traffic steering directives corresponding to the plurality of services associated with each location.

3. The method of claim 1, wherein the traffic steering directives are expressed in a policy-based routing manner, the method further comprising:
    resolving each of the traffic steering directives to a location specific traffic steering indication in accordance with a control plane inventory at a time at which the resolving is performed.

4. The method of claim 3, wherein the resolving includes performing one of a pull operation or a push operation on the control plane inventory for each of the traffic steering directives to obtain the location specific traffic steering indication corresponding to each of the traffic steering directives.

5. The method of claim 1, further comprising:
    receiving an indication of the service graph based on user input to a network management console.

6. The method of claim 1, further comprising:
    receiving registration messages from the plurality of services; and based at least in part on the registration messages, maintaining a central inventory for the services, including a first mapping of each service, by a distinguished name for each of the services, to a distinguished name for a location with which that service is associated and further including a second mapping of each service, by the distinguished name for the service, to a network locator for the location with which the service is associated.

7. The method of claim 1, wherein:
each separate location in the network is an edge device in the network, to which the services are attached.

8. One or more non-transitory computer-readable storage media storing computer-readable instructions that, when executed, instruct one or more processors to perform operations of configuring a network for service insertion, the operations comprising:
identifying endpoints associated with a network fabric and services that execute service functions for traffic communicated between the endpoints and through the network fabric;
generating a service graph that indicates a template service chain, the template service chain defining an ordering of a plurality of services;
generating a master policy that indicates:
  (i) the service graph is to be applied for an endpoint group pair, the endpoint group pair including a source endpoint group and destination endpoint group; and
  (ii) locations in the network at which traffic communicated between the source endpoint group and the destination endpoint group is to be routed through the plurality of services;
using the master policy determining traffic steering directives to be provided to network nodes at the locations in the network to route traffic through the plurality of services; and
providing the network nodes with respective traffic steering directives that instruct the network nodes to route the traffic through the plurality of services.

9. The one or more non-transitory computer-readable storage media of claim 8, wherein a master service graph indicates the template service chain by distinguished names, the operations further comprising:
processing the master service graph with reference to an inventory of services maintained by a control plane of the network and that associates each of the plurality of services with a location to which that service is attached, to generate the service graph, wherein the service graph includes at least an indication, for each location, of the traffic steering directives corresponding to the plurality of services associated with each location.

10. The one or more non-transitory computer-readable storage media of claim 8, wherein the traffic steering directives are expressed in a policy-based routing manner, the operations further comprising:
resolving each of the traffic steering directives to a location specific traffic steering indication in accordance with a control plane inventory at a time at which the resolving is performed.

11. The one or more non-transitory computer-readable storage media of claim 10, wherein the resolving includes performing one of a pull operation or a push operation on the control plane inventory for each of the traffic steering directives to obtain the location specific traffic steering indication corresponding to each of the traffic steering directives.

12. The one or more non-transitory computer-readable storage media of claim 8, the operations further comprising:
receiving an indication of the service graph based on user input to a network management console.

13. The one or more computer-readable storage media of claim 8, the operations further comprising:
receiving registration messages from the plurality of services; and
based at least in part on the registration messages, maintaining a central inventory for the services, including a first mapping of each service, by a distinguished name for each of the services, to a distinguished name for a location with which that service is associated and further including a second mapping of each service, by the distinguished name for the service, to a network locator for the location with which the service is associated.

14. The one or more non-transitory computer-readable storage media of claim 8, wherein:
each separate location in the network is an edge device in the network, to which the services are attached.

15. An edge device in a network fabric, comprising:
one or more processors; and
memory coupled to the one or more processors, the memory storing instructions executable by the one or more processors to perform operations comprising:
receiving a location-specific service graph template, the location-specific service graph template indicating a service to be applied to particular network traffic by the edge device; and
generating a name-resolved location-specific service graph for the edge device, comprising resolving for the service, with reference to an inventory maintained by a control plane of the network fabric, a distinguished name for the service to an edge device interface indication for the service.

16. The edge device of claim 15, the operations further comprising:
for particular network traffic, based on a source of the particular network traffic and a destination of the particular network traffic, processing the name-resolved location-specific service graph for the edge device and, based at least in part thereon, steering the particular network traffic to the service indicated in the location-specific service graph template.

17. The edge device of claim 16, wherein the source of the particular network traffic belongs to a source endpoint group and the destination of the particular network traffic belongs to a destination endpoint group and the source endpoint group and the destination endpoint group are indicated in the name-resolved location-specific service graph for the edge device.

18. The edge device of claim 16, wherein the steering is further based at least in part on an interface of the edge device from which the particular network traffic is received by the edge device.

19. The edge device of claim 18, wherein the steering is to an interface that matches a destination interface indication, in the name-resolved location-specific service graph for the edge device, that is correlated to the interface of the edge device from which the particular network traffic is received by the edge device.

20. The edge device of claim 15, the operations further comprising:
   forwarding, from the service to the control plane of the network fabric, an indication of a distinguished name for the service and an interface of the edge device interface indication for the service.

\* \* \* \* \*

UNITED STATES PATENT AND TRADEMARK OFFICE
CERTIFICATE OF CORRECTION

PATENT NO. : 11,570,109 B2  
APPLICATION NO. : 17/242601  
DATED : January 31, 2023  
INVENTOR(S) : Victor Manuel Moreno et al.

It is certified that error appears in the above-identified patent and that said Letters Patent is hereby corrected as shown below:

In the Claims

Column 16, Line 33, Claim 1, change "services;" to --services; and--.

Signed and Sealed this
Twentieth Day of June, 2023

Katherine Kelly Vidal  
*Director of the United States Patent and Trademark Office*